US010941278B2

(12) United States Patent
Cai et al.

(10) Patent No.: US 10,941,278 B2
(45) Date of Patent: Mar. 9, 2021

(54) CROSSLINKABLE POLYMERIC COMPOSITIONS WITH DIALLYLAMIDE CROSSLINKING COAGENTS, METHODS FOR MAKING THE SAME, AND ARTICLES MADE THEREFROM

(71) Applicant: Dow Global Technologies LLC, Midland, MI (US)

(72) Inventors: Yu Cai, Shanghai (CN); Hong Liang Zhang, Shanghai (CN); Yabin Sun, Shanghai (CN); Jeffrey M. Cogen, Flemington, NJ (US); Saurav S. Sengupta, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 226 days.

(21) Appl. No.: 15/118,257

(22) PCT Filed: Mar. 20, 2015

(86) PCT No.: PCT/CN2015/074713
§ 371 (c)(1),
(2) Date: Aug. 11, 2016

(87) PCT Pub. No.: WO2015/149633
PCT Pub. Date: Oct. 8, 2015

(65) Prior Publication Data
US 2017/0158840 A1 Jun. 8, 2017

(30) Foreign Application Priority Data
Mar. 31, 2014 (WO) ................ PCT/CN2014/074383

(51) Int. Cl.
| C08K 5/20 | (2006.01) |
| C08K 5/00 | (2006.01) |
| H01B 7/02 | (2006.01) |
| C09D 123/06 | (2006.01) |
| H01B 3/44 | (2006.01) |
| C08K 5/14 | (2006.01) |
| C08K 3/00 | (2018.01) |
| C09D 123/04 | (2006.01) |
| C08K 3/014 | (2018.01) |

(52) U.S. Cl.
CPC ................ *C08K 5/20* (2013.01); *C08K 3/014* (2018.01); *C08K 5/005* (2013.01); *C08K 5/14* (2013.01); *C09D 123/04* (2013.01); *C09D 123/06* (2013.01); *H01B 3/441* (2013.01); *H01B 3/447* (2013.01); *H01B 7/02* (2013.01)

(58) Field of Classification Search
None
See application file for complete search history.

(56) References Cited

U.S. PATENT DOCUMENTS

| 3,911,192 A | 10/1975 | Aronoff et al. |
| 4,287,014 A * | 9/1981 | Gaku ...................... B32B 29/00 156/306.9 |
| 4,519,929 A | 5/1985 | O'Brien et al. |
| 5,334,685 A | 8/1994 | Ahmed et al. |
| 6,559,261 B1 * | 5/2003 | Milne ..................... C07C 69/50 526/279 |
| 6,608,120 B1 | 8/2003 | Milne et al. |
| 6,916,871 B2 * | 7/2005 | Hare ....................... B32B 25/14 428/424.6 |
| 6,951,700 B2 | 10/2005 | Goodby et al. |
| 2009/0202769 A1 | 8/2009 | Masuda et al. |
| 2009/0264050 A1 | 10/2009 | Upadhyay et al. |
| 2010/0016515 A1 * | 1/2010 | Chaudhary .......... C08K 5/0025 525/375 |
| 2011/0290418 A1 | 12/2011 | Klemarczyk et al. |
| 2013/0139985 A1 | 6/2013 | Wright |
| 2013/0279174 A1 * | 10/2013 | Cai ....................... B05D 5/063 362/296.02 |
| 2014/0144628 A1 * | 5/2014 | Moradi-Araghi ...... C09K 8/588 166/275 |
| 2015/0203701 A1 | 7/2015 | Sun et al. |
| 2016/0017081 A1 * | 1/2016 | Besser .................. C08F 285/00 524/151 |

FOREIGN PATENT DOCUMENTS

| JP | 2008-05046 A | 1/2008 |
| WO | 2012/017237 A1 | 2/2012 |
| WO | 2012/046039 A2 | 4/2012 |
| WO | 2012/168354 A1 | 12/2012 |
| WO | WO-2012168354 A1 * | 12/2012 ............. C08J 7/047 |
| WO | 2014040237 | 3/2014 |

OTHER PUBLICATIONS

Inata et al., "Postcrosslinking of Linear Polyesters. I Melt-Blend-Type UV-Induced Crosslinking Agents," J. Appl. Polym. Sci., (1998) vol. 35, pp. 1705-1714 (Year: 1998).*
Inata, H et al., Postcrosslinking of Linear Polyesters. I Melt-Blend-Type UV-Induced Crosslinking Agents, J. Appl. Polym. Sci. 1988, 35(7), 1705-1714.
PCT/CN2015/074713, International Preliminary Report on Patentability dated Oct. 4, 2016.
PCT/CN2015/074713, Written Opinion dated Jun. 1, 2015.
PCT/CN2015/074713, Search Report dated Jun. 1, 2015.
Gold Book, International Union of Pure and Applied Chemistry, Compendium of Chemical Terminology, Feb. 24, 2014, pp. ii and 57 Version 2.3.3.

* cited by examiner

*Primary Examiner* — Jennifer A Boyd
*Assistant Examiner* — Ricardo E Lopez

(57) ABSTRACT

Crosslinkable polymeric compositions comprising an ethylene-based polymer, an organic peroxide, and a crosslinking coagent having at least one N,N-diallylamide functional group. Such crosslinkable polymeric compositions and their crosslinked forms can be employed as polymeric layers in wire and cable applications, such as insulation in power cables.

16 Claims, No Drawings

CROSSLINKABLE POLYMERIC COMPOSITIONS WITH DIALLYLAMIDE CROSSLINKING COAGENTS, METHODS FOR MAKING THE SAME, AND ARTICLES MADE THEREFROM

REFERENCE TO RELATED APPLICATIONS

The present application claims the benefit of International Application No. PCT/CN14/074383, filed on Mar. 31, 2014.

FIELD

Various embodiments of the present invention relate to crosslinkable polymeric compositions comprising a crosslinking coagent having at least one N,N-diallylamide functional group, methods of making the same, and articles made therefrom.

INTRODUCTION

Medium, high, and extra-high voltage ("MV," "HV," and "EHV") cables typically contain a crosslinked polymeric material as an insulation layer, such as a crosslinked polyethylene. Such crosslinked polymeric materials can be prepared from a crosslinkable polymeric composition having a peroxide initiator. The radical reactions between peroxide and polyethylene generate undesirable byproducts which must be removed by vacuum after crosslinking the polyethylene. Although advances have been achieved in the field of crosslinkable polymeric compositions, improvements are still desired.

SUMMARY

One embodiment is acrosslinkable polymeric composition, comprising:
  (a) an ethylene-based polymer;
  (b) an organic peroxide; and
  (c) a crosslinking coagent having at least one N,N-diallylamide functional group.

DETAILED DESCRIPTION

Various embodiments of the present invention concern crosslinkable polymeric compositions comprising an ethylene-based polymer, an organic peroxide, and acrosslinking coagent having at least one N,N-diallylamide functional group (a "diallylamide crosslinking coagent"). Additional embodiments concern crosslinked polymeric compositions prepared from such crosslinkable polymeric compositions. Further embodiments concern coated conductors and processes for producing coated conductors using the crosslinkable polymeric compositions.
Crosslinkable Polymeric Composition As noted above, one component of the crosslinkable polymeric compositions described herein is an ethylene-based polymer. As used herein, "ethylene-based" polymers are polymers prepared from ethylene monomers as the primary (i.e., greater than 50 weight percent ("wt %")) monomer component, though other co-monomers may also be employed. "Polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)).

In various embodiments, the ethylene-based polymer can be an ethylene homopolymer. As used herein, "homopolymer" denotes a polymer consisting of repeating units derived from a single monomer type, but does not exclude residual amounts of other components used in preparing the homopolymer, such as chain transfer agents.

In an embodiment, the ethylene-based polymer can be an ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an α-olefin content of less than 50 wt %, less than 45 wt %, less than 40 wt %, or less than 35 wt % based on the entire interpolymer weight. When an α-olefin is employed, the α-olefin can be a $C_{3-20}$ (i.e., having 3 to 20 carbon atoms) linear, branched or cyclic α-olefin. Examples of $C_{3-20}$ α-olefins include propene, 1-butene, 4-methyl-1-pentene, 1-hexene, 1-octene, 1-decease, 1-dodecene, 1-tetradecene, 1-hexadecene, and 1-octadecene. The α-olefins can also have a cyclic structure such as cyclohexane or cyclopentane, resulting in an α-olefin such as 3-cyclohexyl-1-propene (allyl cyclohexane) and vinyl cyclohexane. Illustrative ethylene/α-olefin interpolymers include ethylene/propylene, ethylene/1-butene, ethylene/1-hexene, ethylene/1-octene, ethylene/propylene/1-octene, ethylene/propylene/1-butene, and ethylene/1-butene/1-octene.

In various embodiments, the ethylene-based polymer can be used alone or in combination with one or more other types of ethylene-based polymers (e.g., a blend of two or more ethylene-based polymers that differ from one another by monomer composition and content, catalytic method of preparation, etc). If a blend of ethylene-based polymers is employed, the polymers can be blended by any in-reactor or post-reactor process.

In various embodiments, the ethylene-based polymer can be selected from the group consisting of low-density polyethylene ("LDPE"), linear-low-density polyethylene ("LLDPE"), very-low-density polyethylene ("VLDPE"), and combinations of two or more thereof.

In an embodiment, the ethylene-based polymer can be an LDPE. LDPEs are generally highly branched ethylene homopolymers, and can be prepared via high pressure processes (i.e., HP-LDPE). LDPEs suitable for use herein can have a density ranging from 0.91 to 0.94 g/cm³. In various embodiments, the ethylene-based polymer is a high-pressure LDPE having a density of at least 0.915 g/cm³, but less than 0.94 g/cm³, or less than 0.93 g/cm³. Polymer densities provided herein are determined according to ASTM International ("ASTM") method D792. LDPEs suitable for use herein can have a melt index ($I_2$) of less than 20 g/10 min., or ranging from 0.1 to 10 g/10 min., from 0.5 to 5 g/10 min., from 1 to 3 g/10 min., or an $I_2$ of 2 g/10 min. Melt indices provided herein are determined according to ASTM method D1238. Unless otherwise noted, melt indices are determined at 190° C. and 2.16 Kg (i.e., $I_2$). Generally, LDPEs have a broad molecular weight distribution ("MWD") resulting in a relatively high polydispersity index ("PDI;" ratio of weight-average molecular weight to number-average molecular weight).

In an embodiment, the ethylene-based polymer can be an LLDPE. LLDPEs are generally ethylene-based polymers having a heterogeneous distribution of comonomer (e.g., α-olefin monomer), and are characterized by short-chain branching. For example, LLDPEs can be copolymers of ethylene and α-olefin monomers, such as those described above. LLDPEs suitable for use herein can have a density ranging from 0.916 to 0.925 g/cm$^3$. LLDPEs suitable for use herein can have a melt index ($I_2$) ranging from 1 to 20 g/10 min., or from 3 to 8 g/10 min.

In an embodiment, the ethylene-based polymer can be a VLDPE. VLDPEs may also be known in the art as ultra-low-density polyethylenes, or ULDPEs. VLDPEs are generally ethylene-based polymers having a heterogeneous distribution of comonomer (e.g., α-olefin monomer), and are characterized by short-chain branching. For example, VLDPEs can be copolymers of ethylene and α-olefin monomers, such as one or more of those α-olefin monomers described above. VLDPEs suitable for use herein can have a density ranging from 0.87 to 0.915 g/cm$^3$. VLDPEs suitable for use herein can have a melt index ($I_2$) ranging from 0.1 to 20 g/10 min., or from 0.3 to 5 g/10 min.

In addition to the foregoing, the ethylene-based polymer can contain one or more polar comonomers, such as acrylates or vinyl acetates. Additionally, blends of non-polar ethylene-based polymers, such as those described above, and polar copolymers (e.g., those copolymers containing one or more types of polar comonomers), may also be employed. Furthermore, polyolefin elastomers, such as those commercially available under the trade name ENGAGE™ from The Dow Chemical Company, may be used as the ethylene-based polymer or in combination with one or more of the above-described ethylene-based polymers.

In an embodiment, the ethylene-based polymer can comprise a combination of any two or more of the above-described ethylene-based polymers.

Production processes used for preparing ethylene-based polymers are wide, varied, and known in the art. Any conventional or hereafter discovered production process for producing ethylene-based polymers having the properties described above may be employed for preparing the ethylene-based polymers described herein. In general, polymerization can be accomplished at conditions known in the art for Ziegler-Natta or Kaminsky-Sinn type polymerization reactions, that is, at temperatures from 0 to 250° C., or 30 or 200° C., and pressures from atmospheric to 10,000 atmospheres (1,013 megaPascal ("MPa")). In most polymerization reactions, the molar ratio of catalyst to polymerizable compounds employed is from $10^{-12}:1$ to $10^{-1}:1$, or from $10^{-9}:1$ to $10^{-5}:1$.

An example of a preferred ethylene-based polymer suitable for use herein is low-density polyethylene produced in a high pressure process and having a density of 0.92 g/cm$^3$ and a melt index ($I_2$) of 2 g/10 min.

As noted above, the above-described ethylene-based polymer is combined with an organic peroxide. As used herein, "organic peroxide" denotes a peroxide having the structure: $R^1$—O—O—$R^2$, or $R^1$—O—O—R—O—O—$R^2$, where each of $R^1$ and $R^2$ is a hydrocarbyl moiety, and R is a hydrocarbylene moiety. As used herein, "hydrocarbyl" denotes a univalent group formed by removing a hydrogen atom from a hydrocarbon (e.g. ethyl, phenyl) optionally having one or more heteroatoms. As used herein, "hydrocarbylene" denotes a bivalent group formed by removing two hydrogen atoms from a hydrocarbon optionally having one or more heteroatoms. The organic peroxide can be any dialkyl, diaryl, dialkaryl, or diaralkyl peroxide, having the same or differing alkyl, aryl, alkaryl, or aralkyl moieties. In an embodiment, each of $R^1$ and $R^2$ is independently a $C_1$ to $C_{20}$ or $C_1$ to $C_{12}$ alkyl, aryl, alkaryl, or aralkyl moiety. In an embodiment, R can be a $C_1$ to $C_{20}$ or $C_1$ to $C_{12}$ alkylene, arylene, alkarylene, or aralkylene moiety. In various embodiments, R, $R^1$, and $R^2$ can have the same or a different number of carbon atoms and structure, or any two of R, $R^1$, and $R^2$ can have the same number of carbon atoms while the third has a different number of carbon atoms and structure.

Organic peroxides suitable for use herein include mono-functional peroxides and di-functional peroxides. As used herein, "mono-functional peroxides" denote peroxides having a single pair of covalently bonded oxygen atoms (e.g., having a structure R—O—O—R). As used herein, "di-functional peroxides" denote peroxides having two pairs of covalently bonded oxygen atoms (e.g., having a structure R—O—O—R—O—O—R). In an embodiment, the organic peroxide is a mono-functional peroxide.

Exemplary organic peroxides include dicumyl peroxide ("DCP");tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3; 1,1-bis(t-butylperoxy)-3,3,5-trimethylcyclohexane; isopropylcumyl cumylperoxide; butyl 4,4-di(tert-butylperoxy) valerate; di(isopropylcumyl) peroxide; and mixtures of two or more thereof. In various embodiments, only a single type of organic peroxide is employed. In an embodiment, the organic peroxide is dicumyl peroxide.

As noted above, the crosslinkable polymeric composition further comprises a crosslinking coagent. The crosslinking coagent has at least one N,N-diallylamide functional group. In various embodiments, the crosslinking coagent can have the structure of formula (I):

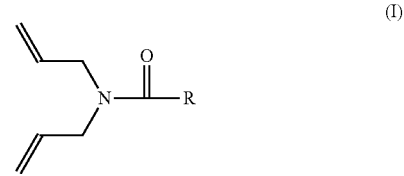

(I)

where R is selected from the group consisting of (a) an alkyl or alkenyl group having from 1 to 20 carbon atoms, (b) a substituent containing an aromatic group that is optionally substituted by one or more additional N,N-diallylamide functional groups, (c) an aliphatic group having one or more additional N,N-diallylamide functional groups, and (d) combinations of two or more thereof. As known to those skilled in the art, an "alkyl" group is a saturated straight-chain or branched aliphatic group, and an "alkenyl" group is a straight-chain or branched aliphatic group having at least one carbon-carbon double bond. In various embodiments, R of formula (I) can be selected from the group consisting of (a) an alkenyl group having a terminal carbon-carbon double bond and from 5 to 15, or from 8 to 12, carbon atoms, (b) an aromatic group (e.g., phenyl) substituted by one or more additional N,N-diallylamide functional groups, (c) an alkyl group having a terminal N,N-diallylamide functional group and from 5 to 15, or from 8 to 12, carbon atoms, and (d) combinations of two or more thereof.

In various embodiments, the diallylamide crosslinking coagent can have a structure selected from the group of formulas (II) through (IV):

(II)

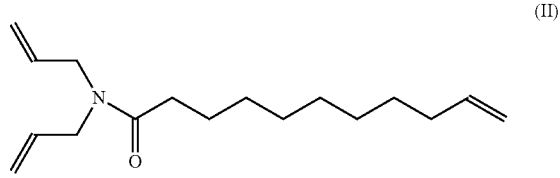

N,N-diallylundec-10-enamide (III)

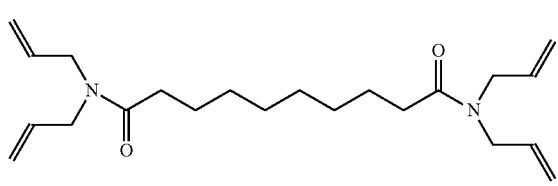

N¹,N¹,N¹⁰,N¹⁰-tetraallyldecanediamide (IV)

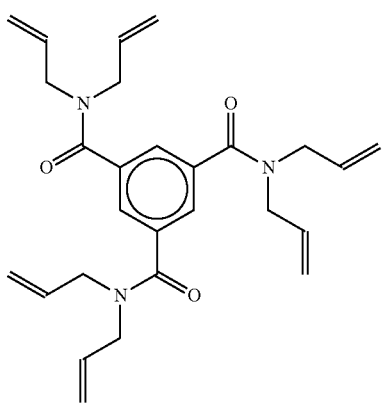

N¹,N¹,N³,N³,N⁵,N⁵-hexaallylbenzene-1,3,5-tricarboxamide

In various embodiments, the crosslinkable polymeric composition can include one or more additional crosslinking coagents. Examples of such crosslinking coagents include polyallyl crosslinking coagents, such as triallyl isocyanurate ("TAIC"), triallyl cyanurate ("TAC"), triallyl trimellitate ("TATM"), triallyl orthoformate, pentaerythritol triallyl ether, triallyl citrate, and triallyl aconitate; ethoxylated bisphenol A dimethacrylate; α-methyl styrene dimer ("AMSD"); acrylate-based coagents, such as trimethylolpropane triacrylate ("TMPTA"), trimethylolpropane trimethylacrylate ("TMPTMA"), 1,6-hexanediol diacrylate, pentaerythritol tetraacrylate, dipentaerythritol pentaacrylate, tris (2-hydroxyethyl) isocyanurate triacrylate, and propoxylated glyceryl triacrylate; vinyl-based coagents, such as polybutadiene having a high 1,2-vinyl content, and trivinyl cyclohexane ("TVCH"); and other coagents as described in U.S. Pat. Nos. 5,346,961 and 4,018,852.

In various embodiments, the diallylamide can constitute at least 1 wt %, at least 10 wt %, at least 50 wt %, at least 75 wt %, at least 90 wt %, or at least 99 wt % of the total amount of crosslinking coagent, based on the total weight of the crosslinking coagent present in the crosslinkable polymeric composition. In further embodiments, the diallylamide can constitute all or substantially all of the crosslinking coagent, based on the total weight of the crosslinking coagent present in the crosslinkable polymeric composition. As used herein, "substantially all" with respect to the diallylamidecrosslinking coagent means all other crosslinking coagents are present in an aggregate amount of 10 parts per million by weight ("ppmw") or less.

In various embodiments, the crosslinkable polymeric composition can comprise the ethylene-based polymer in an amount ranging from 50 to 99 wt %, from 80 to 99 wt %, from 90 to 99 wt %, or from 95 to 99 wt %, based on the entire crosslinkable polymeric composition weight. Additionally, the crosslinkable polymeric composition can comprise the organic peroxide in an amount ranging from 0.1 to 5 wt %, from 0.1 to 3 wt %, from 0.4 to 2 wt %, from 0.4 to 1.7 wt %, from 0.5 to 1.4 wt %, or from 0.7 to less than 1.0 wt %, based on the entire crosslinkable polymeric composition weight. In various embodiments, the organic peroxide can be present in an amount of less than 1.0 wt %, or in the range of from 0.5 to 0.85 wt %, based on the entire crosslinkable polymeric composition weight. In still further embodiments, the organic peroxide can be present in an amount of less than 1.0 parts per hundred resin ("phr"), less than 0.85 phr, or in the range of from 0.5 to 0.85 phr, based on 100 weight parts of the ethylene-based polymer. Furthermore, the crosslinkable polymeric composition can comprise the diallylamidecrosslinking coagent in an amount ranging from 0.1 to 3 wt %, from 0.5 to 3 wt %, from 0.7 to 3 wt %, from 1.0 to 3 wt %, or from 1.2 to 3 wt %, based on the entire crosslinkable polymeric composition weight. In further embodiments, the organic peroxide and diallylamide crosslinking coagent can be present in a coagent-to-peroxide weight ratio of at least 1:1, or greater than 1:1.

In various embodiments, the crosslinking coagent and organic peroxide can be present in amounts sufficient to achieve a molar ratio of allyl groups to active oxygen atoms of at least 1.6, at least 1.9, at least 2.5, or at least 3.0, and up to 5, up to 7.5, up to 10, up to 12, or up to 16 allyl groups/active oxygen atoms. In determining this ratio, only oxygen atoms present as one of two covalently bonded oxygen atoms in the organic peroxide are considered "active oxygen atoms." For example, a mono-functional peroxide has two active oxygen atoms. Oxygen atoms present in the organic peroxide or the polyallyl crosslinking coagent that are not covalently bonded to another oxygen atom are not considered active oxygen atoms. Additionally, only pendant allyl groups found on the polyallyl cross-linking coagent are included in the molar ratio of allyl groups/active oxygen atoms. The allyl-to-active oxygen molar ratio is calculated as follows:

$$\frac{\frac{(\text{moles polyallyl coagent})}{(\text{number of allyl groups per coagent molecule})}}{\frac{(\text{moles peroxide})}{(\text{number of active oxygen atoms per peroxide molecule})}}$$

In addition to the components described above, the crosslinkable polymeric composition may also contain one or more additives including, but not limited to, antioxidants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, flame retardants, and metal deactivators. Additives, other than fillers, are typically used in amounts ranging from 0.01 or less to 10 or more wt % based on total composition weight. Fillers are generally added in larger amounts, although the amount can range from as low as 0.01 or less to 65 or more wt % based on the total composition weight. Illustrative examples of fillers include clays, precipitated silica and silicates, fumed silica, calcium carbonate, ground minerals, aluminum trihydroxide, magnesium hydroxide, and carbon blacks with typical arithmetic mean particle sizes larger than 15 nanometers.

In various embodiments, the crosslinkable polymeric composition can comprise one or more antioxidants. Exemplary antioxidants include hindered phenols (e.g., tetrakis [methylene (3,5-di-t-butyl-4-hydroxyhydrocinnamate)] methane), less-hindered phenols, and semi-hindered phenols; phosphates, phosphites, and phosphonites (e.g., tris (2,4-di-t-butylphenyl) phosphate); thio compounds (e.g., distearyl thiodipropionate, dilaurylthiodipropionate); various siloxanes; and various amines (e.g., polymerized 2,2,4-trimethyl-1,2-dihydroquinoline). In various embodiments, the antioxidant is selected from the group consisting of distearyl thiodipropionate, dilauryl thiodipropionate, octadecyl-3,5-di-t-butyl-4-hydroxyhydrocinnamate, benzenepropanoic acid, 3,5-bis (1,1-dimethylethyl)-4-hydroxy-thiodi-2,1-ehtanediyl ester, stearyl 3-(3,5 -di-t-butyl-4-hydroxyphenyl) propionate, octadecyl-3-(3,5-di-tert-butyl-4-hydroxyphenyl)-propionate, 2,4-bis(dodecylthiomethyl)-6-methylphenol, 4,4'-thiobis(6-tert-butyl-m-cresol), 4,6-bis (octylthiomethyl)-o-cresol, 1,3,5-tris(4-tert-butyl-3-hydroxy-2,6-dimethyl benzyl)-1,3,5-triazine-2,4,6-(1H,3H, 5H)-trione, pentaerythritol tetrakis (3-(3,5-di-t-butyl-4-hydroxyphenyl)propionate), 2',3-bis[[3-[3,5-di-tert-butyl-4-hydroxyphenyl]propionyl]]propionohydrazide, and mixtures of two or more thereof. Antioxidants, when present, can be used in amounts ranging from 0.01 to 5 wt %, from 0.01 to 1 wt %, from 0.1 to 5 wt %, from 0.1 to 1 wt %, or from 0.1 to 0.5 wt %, based on the total weight of the crosslinkable polymeric composition.

Preparation of Crosslinkable Polymeric Composition

Preparation of the cross-linkable polymeric composition can comprise compounding the above-described components. For example, compounding can be performed by either (1) compounding all components into the ethylene-based polymer, or (2) compounding all the components except for the organic peroxide and crosslinking coagent, which can be soaked in as described below. Compounding of the cross-linkable polymeric composition can be effected by standard equipment known to those skilled in the art. Examples of compounding equipment are internal batch mixers, such as a Brabender™, Banbury™, or Bolling™ mixer. Alternatively, continuous single or twin screw, mixers can be used, such as a Farrel™ continuous mixer, a Werner and Pfleiderer™ twin screw mixer, or a Buss™ kneading continuous extruder. Compounding can be performed at a temperature of greater than the melting temperature of the ethylene-based polymer up to a temperature above which the ethylene-based polymer begins to degrade. In various embodiments, compounding can be performed at a temperature ranging from 100 to 200° C., or from 110 to 150° C.

In one or more embodiments, the ethylene-based polymer and any optional components can first be melt compounded according to the above-described procedure and pelletized. Next, the organic peroxide and the cross-linking coagent can be soaked into the resulting ethylene-based polymer compound, either simultaneously or sequentially. In an embodiment, the organic peroxide and coagent can be premixed at the temperature above the melting temperature of the organic peroxide and coagent, whichever is greater, followed by soaking the ethylene-based polymer compound in the resulting mixture of the organic peroxide and cross-linking coagent at a temperature ranging from 30 to 100° C., from 50 to 90° C., or from 60 to 80° C., for a period of time ranging from 1 to 168 hours, from 1 to 24 hours, or from 3 to 12 hours.

The resulting crosslinkable polymeric composition can have certain enhanced properties. Though not wishing to be bound by theory, it is believed that use of a diallylamide crosslinking coagent can surprisingly provide superior resistance to coagent migration out of the crosslinkable polymeric composition. Thus, in various embodiments, the crosslinkable polymeric composition can exhibit a crosslinking coagent migration to the surface of the crosslinkable polymeric composition of less than 1,000 parts per million ("ppm"), less than 750 ppm, less than 500 ppm, or less than 200 ppm, when stored at room temperature 23° C. and 1 atm over a period of four weeks. Furthermore, the crosslinkable polymeric composition can exhibit a crosslinking coagent migration to the surface of the crosslinkable polymeric composition in the range of from 1 to 1,000 ppm, from 10 to 750 ppm, from 50 to 500 ppm, or from 100 to 200 ppm, based on the entire weight of the crosslinkable polymeric composition, when stored at 23° C. and 1 atm over a period of four weeks. The method for determining coagent migration is detailed in the Test Methods section, below, at a coagent loading of 2.34 wt % based on the entire weight of the crosslinkable polymeric composition.

Crosslinked Polymeric Composition

The above-described crosslinkable polymeric composition can be cured or allowed to cure in order to form a crosslinked ethylene-based polymer. Such curing can be performed by subjecting the crosslinkable polymeric composition to elevated temperatures in a heated cure zone, which can be maintained at a temperature in the range of 175 to 260° C. The heated cure zone can be heated by pressurized steam or inductively heated by pressurized nitrogen gas. Thereafter, the crosslinked polymeric composition can be cooled (e.g., to ambient temperature).

The crosslinking process can create volatile decomposition byproducts in the crosslinked polymeric composition. Following crosslinking, the crosslinked polymeric composition can undergo degassing to remove at least a portion of the volatile decomposition byproducts. Degassing can be performed at a degassing temperature, a degassing pressure, and for a degassing time period to produce a degassed polymeric composition. In various embodiments, the degassing temperature can range from 50 to 150° C., or from 60 to 80° C. In an embodiment, the degassing temperature is 65 to 75° C. Degassing can be conducted under standard atmosphere pressure (i.e., 101,325 Pa).

Coated Conductor

A cable comprising a conductor and an insulation layer can be prepared employing the above-described crosslinkable polymeric composition. "Cable" and "power cable" mean at least one wire or optical fiber within a sheath, e.g., an insulation covering and/or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Typical cable designs are illustrated in U.S. Pat. Nos. 5,246,783, 6,496,629 and 6,714,707. "Conductor" denotes one or more wire(s) or fiber(s) for conducting heat, light, and/or electricity. The conductor may be a single-wire/fiber or a multi-wire/fiber and may be in strand form or in tubular form. Non-limiting examples of suitable conductors include metals such as silver, gold, copper, carbon, and aluminum. The conductor may also be optical fiber made from either glass or plastic.

Such a cable can be prepared with various types of extruders (e.g., single or twin screw types) by extruding the crosslinkable polymeric composition onto the conductor, either directly or onto an interceding layer. A description of a conventional extruder can be found in U.S. Pat. No. 4,857,600. An example of co-extrusion and an extruder therefore can be found in U.S. Pat. No. 5,575,965.

Following extrusion, the extruded cable can pass into a heated cure zone downstream of the extrusion die to aid in crosslinking the crosslinkable polymeric composition and thereby produce a crosslinked polymeric composition. The heated cure zone can be maintained at a temperature in the range of 175 to 260° C. In an embodiment, the heated cure zone is a continuous vulcanization ("CV") tube. In various embodiments, the crosslinked polymeric composition can then be cooled and degassed, as discussed above.

Alternating current cables can be prepared according to the present disclosure, which can be low voltage, medium voltage, high voltage, or extra-high voltage cables. Further, direct current cables can be prepared according to the present disclosure, which can include high or extra-high voltage cables.

Test Methods

Density
Determine density according to ASTM D792.
Melt Index
Measure melt index, or $I_2$, in accordance with ASTM D1238, condition 190° C./2.16 kg, and report in grams eluted per 10 minutes.
Moving Die Rheometer ("MDR")
Curing behavior is recorded by MDR at 180° C. according to ASTM D5289.
Nuclear Magnetic Resonance ("NMR")
NMR data were collected from a Bruker Ultrashield 400 plus NMR spectrometer. The peak of deuterated chloroform was used as reference, with its chemical shift set to be 7.27 ppm.
Mass Spectroscopy ("MS")
Liquid Chromatography/Mass Spectrometry
LC-MS data were recorded on Agilent 1220 HPLC/ G6224A TOF mass spectrometer.
Coagent Migration
Pelletized PE samples are stored at ambient conditions for the desired period of time before determining coagent migration. After aging is complete, weigh 3.000±0.001 g pellet sample and place into a 40-mL vial. Add 14.5 mL of acetonitrile into the vial, seal the vial, and shake in a shaker for 5 minutes. Collect the liquid in the 40-mL vial and place into a 2-mL sample vial for high-pressure liquid chromatography ("HPLC") analysis. Analyze the samples by HPLC according to the following conditions:

| LC Parameter | Details |
| --- | --- |
| Column | Agilent Extend-C18, 5 μm particle, 4.6 mm × 150 mm |
| Column Oven | 40° C. |
| Flow rate | 1.0 mL/min. |
| Injection volume | 10 μL |
| Detector | UV absorbance at 210 nm |
| Mobile Phase A | Water |
| Mobile Phase B | Acetonitrile |

-continued

| Time (min.) | B % | Flow Rate (mL/min.) |
| --- | --- | --- |
| 0.00 | 60 | 1.0 |
| 8.00 | 80 | 1.0 |
| 10.00 | 95 | 1.0 |
| 12.00 | 100 | 1.0 |
| 25.00 | 100 | 1.0 |
| 25.10 | 60 | 1.0 |

The co-agent content in acetonitrile ("ACN") solution is calculated from pre-established calibration curve. A calibration curve is established by plotting UV absorbance response from the HPLC detector against acetonitrile solutions of a certain co-agent at several different concentrations. Then the concentration of a sample co-agent solution can be determined from this pre-established curve. With the known content of co-agent in a sample solution, the migration level from the sample can be back-calculated. The numerical value is given in ppm of total weight of a XLPE compound.

Materials

The following materials are employed in the Examples, below.

The low-density polyethylene ("LDPE") employed has a melt index ($I_2$) of 2 g/10 min. and a density of 0.920 g/cm$^3$. The LDPE ("LDPE 1") is produced by The Dow Chemical Company, Midland Mich., USA and contains 0.14 wt % Cyanox 1790 (from Cytec Industries), 0.23 wt % DSTDP (from Reagens) and 0.008 wt % Cyasorb UV 3346 (from Cytec Industries).

A second LDPE is employed that has a melt index ($I_2$) of 2 g/10 min. and a density of 0.920 g/cm$^3$. The LDPE ("LDPE 2") is produced by The Dow Chemical Company, Midland, Mich.

Dicumyl peroxide is commercially available from Shanghai Fangruida Chemicals Co., Ltd.

Sebacid acid is commercially available from Sigma-Aldrich Corporation.

Diallylamine is commercially available from Sigma-Aldrich Corporation.

N-(3-Dimethylaminopropyl)-N'-ethylcarbodiimide hydrochloride ("EDCI") is commercially available from Sigma-Aldrich Corporation.

4-(Dimethylamino)pyridine ("DMAP") is commercially available from Sigma-Aldrich Corporation.

Dichloromethane is commercially available from Sigma-Aldrich Corporation.

Magnesium sulfate is commercially available from Sigma-Aldrich Corporation.

10-Undecenoic acid is commercially available from Sigma-Aldrich Corporation.

1,3,5-Trimesoyl chloride is commercially available from Sigma-Aldrich Corporation.

1,3,5-Trihydroxybenzene is commercially available from Sigma-Aldrich Corporation.

Triallyl isocyanurate ("TAIC") is commercially available from Shanghai Fangruida Chemicals Co., Ltd.

Stabilizer Preblend is a melt blend of 37:61:2 wt % mixture of Cyanox 1790 (from Cytec Industries), DSTDP (from Reagens) and Cyasorb UV 3346 (from Cytec Industries).

4,4'-(Propane-2,2-diyl)bis((allyloxy)benzene) (Coagent B) has the following structure:

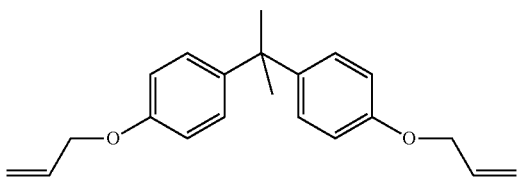 [SMILES: C=CCOc1ccc(C(C)(C)c2ccc(OCC=C)cc2)cc1]

4,4'-(propane-2,2-diyl)bis((allyloxy)benzene) is commercially available from Laiyu Chemicals (Shandong, China)

EXAMPLES

Coagent Preparation Procedure

Preparation of $N^1,N^1,N^{10},N^{10}$-tetraallyldecanediamide (coagent I):

Dissolve sebacic acid (3 g, 0.0148 mol), diallylamine (2.88 g, 0.0296 mol), EDCI (5.96 g, 0.0311 mol), and DMAP (0.135 g, 0.0011 mol) in dichloromethane (35 mL). Stir the solution on a magnetic stirrer for 5 hours, and then extract sequentially with water (10 mL), hydrochloric acid (5 wt %, 10 mL), and saturated hydrochloride solution (10 mL) Dry the organic solution over magnesium sulfate, filter, and evaporate by rotary evaporation (500 mbar, 40° C.) and dynamic vacuum for 2 hours. This yields a pale-yellow oil (4.86 g, 91%).$^1$H NMR (400 MHz, CDCl$_3$) δ 5.75 (m, 4H), 5.14 (m, 8H), 3.92 (d, 8H), 2.30 (t, 4H), 1.63 (m, 4H), 1.30 (s, 8H). ESI-MS (m/z, MH$^+$) Calculated: 361.29 Da., found: 361.32 Da.

Preparation of N,N-diallylundec-10-enamide (coagent II).

Dissolve 10-undecenoic acid (3 g, 0.0163 mol), diallylamine (1.58 g, 0.0163 mol), EDCI (3.43 g, 0.0179 mol), and DMAP (0.074 g, 0.61 mmol) in dichloromethane (35 mL). Stir the solution on a magnetic stirrer for 5 hours, and then extract sequentially with water (10 mL), hydrochloric acid (5 wt %, 10 mL), and saturated sodium chloride solution (10 mL). Dry the organic solution over magnesium sulfate, filter, and evaporate by rotary evaporation (500 mbar, 40° C.)and dynamic vacuum. This yields a clear oil (3.86 g, 90%).$^1$H NMR (400 MHz, CDCl$_3$) δ 5.79 (m, 3H), 5.17 (m, 4H), 4.95 (2d, 2H), 3.92 (2d, 4H), 2.29 (t, 2H), 2.02 (q, 2H), 1.62 (m, 2H), 1.29 (m, 10H). ESI-MS (m/z, MH$^+$) Calculated: 264.23 Da., found: 264.26 Da.

Preparation of $N^1,N^1,N^3,N^3,N^5,N^5$-hexaallylbenzene-1,3,5-tricarboxamide (coagent III).

Dissolve 1,3,5-trimesoyl chloride (5 g, 0.0188 mol) in dichloromethane (50 mL) by constant magnetic stirring, and the cool the solution to 4° C. in an ice water bath. To this stirred solution is added dropwise a solution of diallylamine (12.07 g, 0.124 mol) in dichloromethane (10 mL) at 4° Cover 1 hour. When the addition is complete, warm the resulting solution up to room temperature and continue stirring for another 3 hours. The solution is then extracted sequentially by water (10 mL), hydrochloric acid (5 wt %, 10 mL), and saturated sodium chloride solution. Dry the organic solution over magnesium sulfate, filter, and evaporate by rotary evaporation (500 mbar, 40° C.) and dynamic vacuum (2 hours). The crude product is further purified by column chromatography (silica; dichloromethane). This yields a pale yellow oil (4.89 g, 58%).$^1$H NMR (400 MHz, CDCl$_3$) δ 7.57 (s, 3H), 5.70 (m, 6H), 5.22 (m, 12H), 3.97 (d, 12H). ESI-MS (m/z, MH$^+$) Calculated: 448.26 Da, found: 448.27 Da.

Preparation of 1,3,5-tris(allyloxy)benzene (Comparative Coagent A)

1,3,5-Tris(allyloxy)benzenehas the following structure:

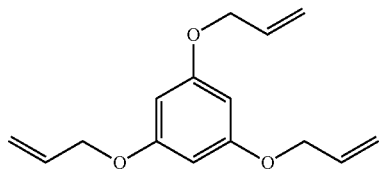 [SMILES: C=CCOc1cc(OCC=C)cc(OCC=C)c1]

Dissolve 1,3,5-trihydroxybenzene (5 g, 0.0396 mol) in N,N-dimethylformamide ("DMF") (40 mL) by constant magnetic stirring, and add potassium carbonate (21.89 g, 0.158 mol) .The resulting mixture is heated by a thermally controlled oil bath at 50° C. for half an hour. Add allyl bromide (19.11 g, 0.158 mol) dropwise. The addition is complete in half an hour, and the suspension is heated to 80° C. for 16 hours. The reaction mixture is then cooled to room temperature, diluted with water, and extracted by ethyl ether(3×50 mL). The ether solution is extracted by water (20 mL), dried over magnesium sulfate, and concentrated by rotary evaporation (500 mbar, 25° C.) and dynamic vacuum (2 hours). The resulting orange oil is separated by silica gel chromatography (hexanes/ethyl acetate 20:1) to afford a pale yellow oil (5.96 g) as the final product.$^1$H NMR (400 MHz, CDCl$_3$) δ 6.15 (s, 3H), 6.04 (m, 3H), 5.36 (m, 6H), 4.49 (m, 6H). ESI-MS (m/z, MH$^+$) Calculated: 247.13 Da, found: 247.15 Da.

Sample Compounding

All samples used in the following Examples are compounded according to the following procedure. First, feed polyethylene pellets and stabilizer preblend, if present, into a Haake mixer at 120° C. Allow the polyethylene to melt completely at a rotor speed of 30 rpm. Next, add the coagent and melt mix at 30 rpm for 1 minute. Then the dicumyl peroxide ("DCP") is slowly added to the melt over half a minute and then mixed at 35 rpm for 3 minutes. Thereafter, the rotation is stopped, and the composition is removed from the Haake mixer and promptly hot pressed to a 1-mm-thick sheet at 120° C.

Example 1

Curing Behavior

Prepare three Samples (S1-S3) and one Comparative Sample (CS1) according to the formulations provided in Table 1, below, and using the sample preparation methods described above. CS1 contains peroxide as the sole cross-linking agent (i.e., no coagent), while S 1-S3 contain peroxide as well as Coagents (I) through (III), respectively.

TABLE 1

Compositions of CS1 and S1-S3

| Component | CS1 | S1 | S2 | S3 |
|---|---|---|---|---|
| LDPE 1 (g) | 98.6 | 97.92 | 97.35 | 97.17 |
| DCP (g) | 1.4 | 0.85 | 0.85 | 0.85 |
| Coagent I (g) | — | 1.23 | — | — |
| Coagent II (g) | — | — | 1.80 | — |
| Coagent III (g) | — | — | — | 1.98 |
| Allyl-to-Active Oxygen ratio (molar) | — | 2.2 | 3.3 | 4.2 |

TABLE 1-continued

| Compositions of CS1 and S1-S3 | | | | |
|---|---|---|---|---|
| Component | CS1 | S1 | S2 | S3 |
| Coagent-to-DCP ratio (weight) | — | 1.4 | 2.1 | 2.3 |

Analyze CS1 and S1-S3 for curing behavior using the above-described Test Methods. The results are provided in Table 2, below.

TABLE 2

| Curing Properties of CS1 and S1-S3 | | | | |
|---|---|---|---|---|
| Properties | CS1 | S1 | S2 | S3 |
| ML (dN · m) | 0.19 | 0.18 | 0.15 | 0.17 |
| MH (dN · m) | 3.19 | 2.79 | 2.86 | 2.98 |
| MH − ML (dN · m) | 3.00 | 2.61 | 2.71 | 2.81 |

The results in Table 2 indicate that the addition of diallylamide coagents can compensate for decreases in DCP loading and keep MH (i.e., the maximum torque value recorded on a vulcanization curve after crosslinking) greater than 2.7 dN·m.

Example 2

Coagent Migration

Prepare two additional Comparative Samples (CS2 and CS3) and one additional Sample (S4) according to the formulations provided in Table 3, below, and using the sample preparation methods described above. CS2 and CS3 are prepared with TAIC as the cogent, and S2 is prepared with Coagent III as the crosslinking coagent.

TABLE 3

| Compositions of CS2, CS3, and S4 | | | |
|---|---|---|---|
| Component | CS2 | CS3 | S4 |
| LDPE 1 (g) | 65.4 | 65.6 | 64.71 |
| LDPE 2 (g) | 32.7 | 32.8 | 32.35 |
| DCP (g) | 0.5 | 0.75 | 0.6 |
| TAIC (g) | 1.6 | 0.85 | — |
| Coagent III (g) | — | — | 2.34 |
| Allyl-to-Active Oxygen ratio (molar) | 5.2 | 1.8 | 7.1 |
| Coagent-to-DCP ratio (weight) | 3.2 | 1.1 | 3.9 |

Analyze CS2, CS3, and S4 for coagent migration according to the above-described Test Methods. The results are provided in Table 4, below.

TABLE 4

| Coagent Migration of CS2, CS3, and S4 | | | |
|---|---|---|---|
| Condition | CS2 | CS3 | S4 |
| Aging at 23° C. temperature, 4 weeks (ppm) | 3,010 | 1,394 | 132 |

The results provided in Table 4 show greatly reduced coagent migration to the surface of the polymer composition for S4 (about one tenth the amount of migration seen in CS3). This is particularly surprising given that the Coagent III in S4 is present in an amount of about three times that of TAIC in CS3.

Example 3

Ether-linked Allyl Coagents

Prepare two additional Comparative Samples (CS4 and CS5) and a Control Sample according to the formulations provided in Table 5, below, and using the sample preparation methods described above. The Control Sample is prepared with TAIC as the crosslinking coagent, Comparative Sample 4 is prepared with Comparative Coagent A (1,3,5-tris(allyloxy)benzene) as the crosslinking coagent, and Comparative Sample 5 is prepared with Comparative Coagent B (4,4'-(Propane-2,2-diyl)bis((allyloxy)benzene)) as the crosslinking coagent.

TABLE 5

| Compositions of Control, CS4, and CS5 | | | |
|---|---|---|---|
| Component | Control | CS4 | CS5 |
| LDPE 1 (g) | 98.3 | 98.31 | — |
| LDPE 2 (g) | — | — | 97.85 |
| DCP (g) | 0.85 | 0.85 | 1 |
| TAIC (g) | 0.85 | — | — |
| Coagent A (g) | — | 0.84 | — |
| Coagent B (g) | — | — | 0.93 |
| Stabilizer Preblend (g) | — | — | 0.22 |
| Allyl-to-Active Oxygen ratio (molar) | 1.6 | 1.6 | 0.8 |
| Coagent-to-DCP ratio (weight) | 1.0 | 1.0 | 0.9 |

Analyze the Control Sample, CS4, and CS5 for curing behavior using the above-described Test Methods. The results are provided in Table 6, below.

TABLE 6

| Curing Properties of Control Sample, CS4, and CS5 | | | |
|---|---|---|---|
| Properties | Control | CS4 | CS5 |
| ML (dN · m) | 0.19 | 0.17 | 0.17 |
| MH (dN · m) | 3.86 | 0.62 | 0.75 |
| MH − ML (dN · m) | 3.67 | 0.45 | 0.58 |

As shown in the results of Table 6, the use of ether-linked allyl coagents provides insufficient curing potential, as evidenced by the low MH values (i.e., the maximum torque value recorded on a vulcanization curve after crosslinking) of CS4 and CS5.

The invention claimed is:

1. A crosslinkable polymeric composition, comprising:
   (a) an ethylene-based polymer that is a low-density polyethylene;
   (b) an organic peroxide; and
   (c) a crosslinking coagent having at least one N,N-diallylamide functional group; wherein said crosslinking coagent has a structure of formula (I):

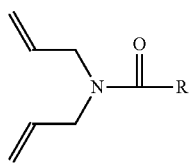

wherein R is selected from the group consisting of an alkenyl group having a terminal carbon-carbon double bond and from 5 to 15 carbon atoms;

wherein the crosslinkable polymeric composition can be cured or allowed to cure in order to form a crosslinked ethylene-based polymer that is a crosslinked low-density polyethylene.

2. The crosslinkable polymeric composition of claim 1, wherein said crosslinking coagent has a structure of formula (II):

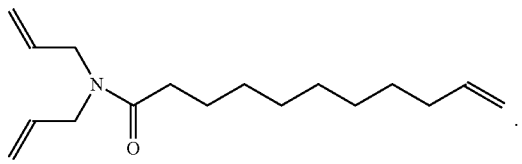

3. The crosslinkable polymeric composition of claim 1, wherein said crosslinking coagent and said organic peroxide are present in a coagent-to-peroxide weight ratio of greater than 1:1.

4. The crosslinkable polymeric composition of claim 1, wherein said ethylene-based polymer comprises a high-pressure low-density polyethylene; wherein said organic peroxide comprises dicumyl peroxide; wherein said crosslinkable polymeric composition further comprises an antioxidant.

5. The crosslinkable polymeric composition of claim 1, wherein said ethylene-based polymer is present in an amount ranging from 50 to 99 weight percent, based on the entire crosslinkable polymeric composition weight; wherein said organic peroxide is present in an amount of less than 1.0 weight percent, based on the entire crosslinkable polymeric composition weight; wherein said crosslinking coagent is present in an amount ranging from 0.1 to 3 weight percent, based on the entire crosslinkable polymeric composition weight.

6. The crosslinkable polymeric composition of claim 1, wherein said crosslinkable polymeric composition exhibits a crosslinking coagent migration to the surface of said crosslinkable polymeric composition of less than 1,000 parts per million, based on the total weight of said crosslinkable polymeric composition, when stored for four weeks at 23° C. and 1 atm, as measured by Coagent Migration test method.

7. A crosslinked article prepared from the crosslinkable polymeric composition according to claim 1.

8. A coated conductor, comprising:
a conductive core; and
a polymeric layer at least partially surrounding said conductive core, wherein at least a portion of said polymeric layer comprises said crosslinked article of claim 7.

9. A crosslinkable polymeric composition, comprising:
(a) an ethylene-based polymer that is a low-density polyethylene;
(b) an organic peroxide; and
(c) a crosslinking coagent having at least one N,N-diallylamide functional group; wherein said crosslinking coagent has a structure of formula (III):

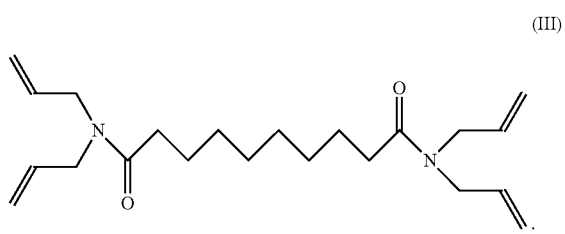 [SMILES: C=CCN(CC=C)C(=O)CCCCCCCCC(=O)N(CC=C)CC=C]

10. The crosslinkable polymeric composition of claim 9, wherein R consists of an alkyl group having a terminal N,N-diallylamide functional group, and combinations of two or more thereof.

11. The crosslinkable polymeric composition of claim 9, wherein said crosslinking coagent and said organic peroxide are present in a coagent-to-peroxide weight ratio of greater than 1:1.

12. The crosslinkable polymeric composition of claim 9, wherein said ethylene-based polymer comprises a high-pressure low-density polyethylene; wherein said organic peroxide comprises dicumyl peroxide; wherein said crosslinkable polymeric composition further comprises an antioxidant.

13. The crosslinkable polymeric composition of claim 9, wherein said ethylene-based polymer is present in an amount ranging from 50 to 99 weight percent, based on the entire crosslinkable polymeric composition weight; wherein said organic peroxide is present in an amount of less than 1.0 weight percent, based on the entire crosslinkable polymeric composition weight; wherein said crosslinking coagent is present in an amount ranging from 0.1 to 3 weight percent, based on the entire crosslinkable polymeric composition weight.

14. The crosslinkable polymeric composition of claim 9, wherein said crosslinkable polymeric composition exhibits a crosslinking coagent migration to the surface of said crosslinkable polymeric composition of less than 1,000 parts per million, based on the total weight of said crosslinkable polymeric composition, when stored for four weeks at 23° C. and 1 atm, as measured by Coagent Migration test method.

15. A crosslinked article prepared from the crosslinkable polymeric composition according to claim 9.

16. A coated conductor, comprising:
a conductive core; and
a polymeric layer at least partially surrounding said conductive core, wherein at least a portion of said polymeric layer comprises said crosslinked article of claim 15.

* * * * *